Patented Sept. 27, 1938

2,131,342

UNITED STATES PATENT OFFICE 2,131,342

CALKING AND SEALING COMPOSITION

Emile L. Baldeschwieler, Cranford, N. J., assignor to Standard Oil Development Company, a corporation of Delaware No Drawing. Application December 20, 1933, Serial No. 703,209

6 Claims. (Cl. 106—8)

This invention relates to the preparation of calking and sealing compositions, and particularly to the use of certain types of linear polymers for the production of calking and sealing compositions that are characterized by their adhesiveness and alkali-, acid-, and water-resistant properties.

The polymers used in this invention are materials ranging in molecular weight from about 1,000 to a value in the neighborhood of 10,000 and higher, depending on the manner in which they are made. Such polymers are obtained by polymerizing isobutylene. The polymerization of isobutylene is generally carried out below 0° or —10° C. and preferably at —40° to —80° C., with a halide catalyst such as boron fluoride, although aluminum chloride, titanium tetrachloride, etc., may also be used in many cases, the molecular weight of the polymer generally being controlled by the purity of the unsaturated hydrocarbon, the catalyst, and the temperature of polymerization. The higher polymers are obtained at very low temperatures and with very pure olefines. Solvents such as ethane, propane, butane, and the like, may be mixed with the unsaturated hydrocarbon prior to neutralization.

An object of this invention is the production of a calking and sealing composition which may be used to calk the sides and decks of a boat, that will render the boat leak-proof even though subjected to various degrees of temperature, humidity, and vibration.

Another object of this invention is the production of a calking and sealing composition which may be used to make a vessel leak-proof in which acid, alkali or water is kept or circulated.

Decks of boats, particularly passenger boats, are generally made of planks 4″ wide with expansion grooves of about ¼″ to allow for expansion of the boards as they swell. These grooves heretofore have been filled first with layers of oakum and cotton and then with a calking composition such as glue, which was generally pounded in the grooves by hand, so that a prolonged period of time was required to fill the grooves of a large boat. The glue or other calking compositions that were used could not be heated and run into the grooves, as when heated they become lumpy and stringy and were not suited for pouring or otherwise forcing into the grooves. Another objection to the use of glue was that it tended to soften and come out when a boat was in the tropical climates, and upon scrubbing the deck the glue was picked up leaving the grooves empty, which necessitated recalking of the deck.

According to this invention, a suitable calking material is prepared by incorporating a high molecular weight polymer obtained by polymerization of isobutylene with inert inorganic or organic fillers. Materials such as calcium carbonate, barium sulfate, silica, ground mineral wool, lithopone, zinc oxide, iron oxide, cuprene, aluminum powder, etc. may be used as the inert fillers. Plasticizers such as mineral or synthetic oils, petrolatum, rosin, asphalt, resins, waxes, vegetable oils, etc. may also be incorporated if desired. The quantity of high molecular weight polymer of isobutylene incorporated with the inorganic fillers may be varied from 5% to 95%, depending on whether a soft or hard calking material is required or whether a sticky or non-sticky material is desired, as the amounts of inorganic filler added tend to reduce the sticky property of the polymer. The consistency of the calking material may be varied so that when a calking machine is used, a more plastic material is provided which may be forced into the grooves by the machine. Where hand labor is required to force the calking material into the grooves, a harder calking composition is used. If desired, a calking composition may be prepared so that, by means of heat, it may be rendered semi-liquid and may then be poured into the grooves which, on cooling, may readily be leveled off even with the surface of the planks that are being calked.

This calking material is also suitable for stopping crevices or cracks in barrels or other containers of wood, metal, plastic, ceramic, paper, composition, synthetic resin, etc. Due to its excellent resistance it is especially useful in stopping leaks in vessels that are used for the storage of acids or alkalies. It has been found suitable for stopping leaks in pipes, although where pressure is used it may be advisable to hold this calking composition in place by means of a reinforcing material as tape or a metallic band. It has been found especially suitable for use as a window cement and like purposes.

This calking composition can be prepared to meet every particular need since the fluidity can be varied at will either by choosing a polymer of a suitable molecular weight or by changing the proportion of the inorganic filler and the plasticizer.

The foregoing description is merely illustrative and alternative arrangements may be made within the scope of the appended claims in which it is my intention to claim all novelty as broadly as the prior art permits.

I claim:

1. The method of calking and sealing joints, crevices, cracks and leaks to make them waterproof and resistant to alkali and acid in spite of changes in temperature, humidity and vibrations, which comprises injecting thereinto a calking and sealing composition comprising a filler, a high molecular weight linear polymer obtained by polymerization of isobutylene and a plasticizer.

2. The method of calking and sealing joints, cracks and the like, which comprises injecting thereinto a composition comprising an inorganic filler and a polymer of over 1,000 molecular weight obtained by polymerization of isobutylene.

3. Method according to claim 2, in which the inorganic filler is iron oxide.

4. Method according to claim 2, in which the inorganic filler is barium sulfate.

5. Method according to claim 2, in which the inorganic filler is silica.

6. The method of calking and sealing joints, crevices, cracks and leaks, which comprises injecting thereinto a composition comprising an inorganic filler, a plasticizer and a linear polymer of over 1,000 molecular weight obtained by polymerization of isobutylene.

EMILE L. BALDESCHWIELER.